United States Patent [19]

Infante et al.

[11] 3,839,669

[45] Oct. 1, 1974

[54] DARK CURRENT TEMPERATURE COMPENSATION VIA DC RESTORATION CIRCUIT

[75] Inventors: Carlo Infante, Portland; Donald Kistler Roberts, Beaverton, both of Oreg.

[73] Assignee: Tektronix, Inc., Beaverton, Oreg.

[22] Filed: July 27, 1973

[21] Appl. No.: 383,412

[52] U.S. Cl......... 323/1, 178/DIG. 14, 178/DIG. 26, 323/8, 323/68

[51] Int. Cl. ............................................ H04n 5/18

[58] Field of Search... 178/7.3 DC, DIG. 14, DIG. 26; 307/237; 323/16, 19, 68, 1, 7, 8, 81

[56] References Cited

UNITED STATES PATENTS

| | | | |
|---|---|---|---|
| 2,942,148 | 6/1960 | Fathauer et al | 178/DIG. 14 |
| 3,038,150 | 6/1962 | Bechberger | 323/68 UX |
| 3,551,596 | 12/1970 | Borenstein | 178/7.3 DC |
| 3,649,847 | 3/1972 | Limberg | 307/237 |
| 3,651,339 | 3/1972 | Herrmann et al | 307/237 |
| 3,681,619 | 8/1972 | Remy | 307/237 |

*Primary Examiner*—A. D. Pellinen
*Attorney, Agent, or Firm*—Adrian J. LaRue

[57] ABSTRACT

A DC restoration circuit to compensate for baseline variations of a video signal initiated by temperature changes of diode array targets of tubes such as vidicons or scan converters from which the video signal is derived. An input current to an operational amplifier arrives at the amplifier input via a forward biased diode from a current source in series with a temperature sensitive resistor. The operational amplifier provides an output voltage in response to the input current which is continuously variable with temperature and which has an equal magnitude but having an inverse relation to the baseline variations of the video signal.

8 Claims, 1 Drawing Figure

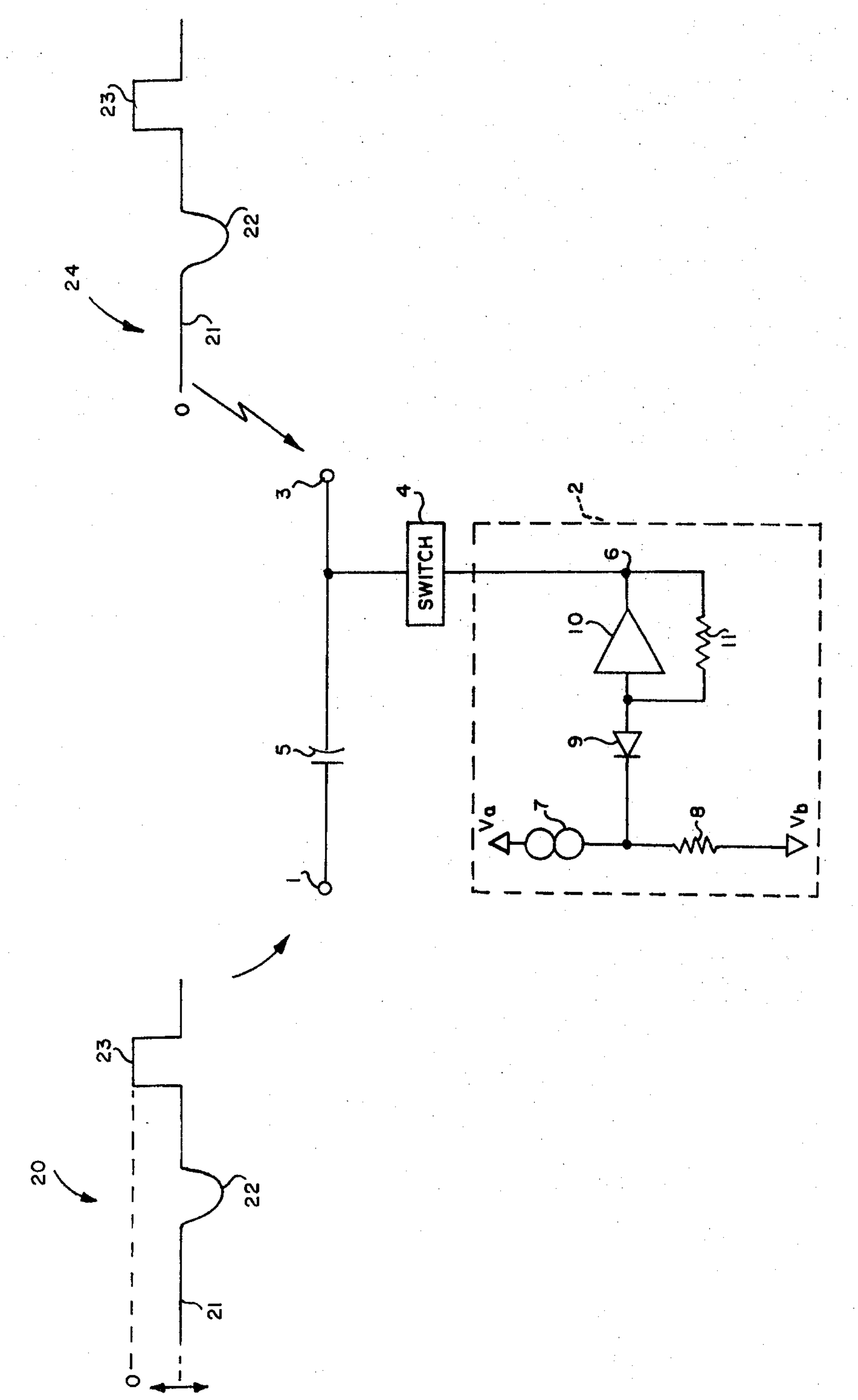
SWITCH
Va
Vb

DARK CURRENT TEMPERATURE COMPENSATION VIA DC RESTORATION CIRCUIT

BACKGROUND OF THE INVENTION

In modern tubes such as vidicons and scan converters that employ silicon diode array targets, the baseline or dark current level of the scanned image is a strong function of temperature as it is related to the leakage or saturation current of back biased diodes. Such current, as is well-known, doubles for every 10° C increase in ambient temperature. For example, at 30° C such current is typically 10 nAmp rising to 80 nAmp at 60° C, while the signal current is of the order of 200 nAmp.

As is well-known, alternating current coupling followed by a conventional keyed clamp stage is generally used in video systems. Such coupling uses an electronic switch to periodically establish a reference level (e.g., ground) during line flyback time. Thus, systems using conventional circuits as briefly discussed above and operated over the wide temperature range that equipment is normally subjected to, requires a constant readjustment to maintain a constant output level.

SUMMARY OF INVENTION

The present invention provides a circuit to automatically compensate for the variation of dark current with temperature, over a wide range of temperature, by providing a keyed clamp circuit whose reference level is variable with temperature rather than fixed so that the voltage level of the baseline is held at ground.

The circuit produces a reference clamp voltage which will vary with temperature in the desired way, i.e., double for every 10° C increase, as does dark current, but in a reverse direction to automatically keep the baseline fixed at ground.

It is therefore an object of the present invention to provide a DC restoration circuit which overcomes the disadvantages of the prior art.

It is another object of the present invention to provide a DC restoration circuit whose output voltage level is variable with temperature.

It is yet another object of the present invention to provide for use in a system employing silicon diode array targets a new and improved automatic dark current temperature compensation via a DC restoration circuit.

Another object of the present invention is to provide an output video waveform in a system employing silicon diode targets wherein dark current level is kept at a constant level.

The subject matter of the invention is particularly pointed out and distinctly claimed in the concluding portion of this specification. The invention, however, both to organization and method of operation, together with further advantages and objects thereof, may best be understood by reference to the following description taken in conjunction with the accompanying drawings.

DESCRIPTION OF DRAWING

The FIGURE is a schematic representation of the preferred embodiment of the dark current temperature compensating DC restoration circuit according to the present invention.

DETAILED DESCRIPTION OF INVENTION

Referring to the drawing there is shown a circuit, in partial block form, according to the present invention having an input terminal 1 which is connected to an input signal source, (not shown) and a temperature compensating network 2 connected between the input terminal 1 and an output terminal 3; the network connected to the output via a conventional switch 4. Disposed between the input terminal 1 and output terminal 3 is a clamp coupling capacitor 5.

Considering briefly the operation of the circuit as a whole and assuming for the moment that an input signal exists at input terminal 1, the direct current component of such signal is blocked by the capacitor 5, then restored by the action of network 2 and switch 4. Such restoration is accomplished by discharging the capacitor 5 during selected time intervals to a reference voltage level provided by network 2. Although not shown, it is well-known how to select such time intervals to operate switch 4.

Temperature compensating network 2 comprises an output terminal 6 which is directly connected to switch 4. The voltage at terminal 6 automatically adjusts the DC level at the output terminal 3 with respect to temperature rather than being fixed. A constant current source 7 has one terminal connected to a source of potential Va and the other terminal is connected to a resistor 8 and the cathode of a diode 9. The other end of resistor 8 is connected to a second source of potential $V_b$. Disposed between the anode of diode 9 and the network output terminal 6 is a high gain amplifier 10. In parallel with the amplifier 10 is a resistor 11.

Further understanding of the network 2 will be accomplished by providing hereunder a partial mathematical description of such network. Assume that a voltage E at the network output terminal 6 is automatically variable with temperature. To produce such voltage, the technique of the present invention is based on a wellknown equation for a forward biased diode, such equation being $$i = i_o\,[\exp(qV/KT) - 1] \approx i_o\,[\exp(qV/KT)]$$

where $i_o$ is saturation current, q and K are conventional constants, and V is the voltage drop across the diode. If the expression $qV/KT$ is made linear by letting V change suitably with temperature, then $i$ will be proportional to $i_o$ and the desired variation with temperature will be obtained since, as is well-known, $i_o$ doubles for every 10° C.

Continuing, high gain amplifier 10 and resistor 11 in a conventional manner converts the current $i$ into a voltage at terminal 6 such that $$E = -Ci,$$

where C is a constant with temperature. The resistor 8 is a resistor whose resistance value varies suitably with temperature such a copper, etc. As resistor 8 is a conductor, its resistance varies according to the well known law $$R = R_o\,(1 + \alpha t),$$

where $\alpha$ is a constant dependent upon the material chosen.

Therefore, the bias across the diode 9 due to temperature becomes $$V_{(T)} = i R_0 (1 + \alpha t),$$

where $i$ is the current supplied by current source 7. Thus, an output voltage at terminal 6 is developed by the action of high gain amplifier 10, such voltage being $E = iR$, where R is the resistor 11. As resistor 8 is preferably copper, then a close approximation to the required behavior of E is obtained.

Considering now the operation of the circuit, assume the input terminal 1 is connected to a voltage source whose output is proportional to the target current of a device such as a vidicon or a scan converter that employ silicon diode array targets and that the waveform 20 is the received signal.

Waveform 20 represents one line of a scanned image including flyback time. Its baseline or dark current level 21 is a strong function of temperature as it is related to the leakage or saturation current of such diode array targets. Already stated, this current doubles for every 10° C increase in ambient temperature. Such doubling would result in undesirable brightness changes when such signal was viewed, say, on a normal television viewing device. The image signal current and the flyback current of the waveform 20 are designated 22 and 23 respectively.

During flyback time the signal current is zero as the device is blanked following conventional practice. At output terminal 3 the waveform 24 will be restored to the level E already discussed. Since the voltage has been made equal and opposite to the dark current level, such level will be at ground irrespective of temperature changes.

While there has been shown and described the preferred embodiment of the present invention, it will be apparent to those skilled in the art that many changes and modifications may be made without departing therefrom in its broader aspects. For example, the constant current source 7 may be made adjustable so as to compensate for any production tolerances. Further, the resistor 8 could be an inductor made of copper in close physical proximity to the target. Therefore, the appended claims are intended to cover all such changes and modifications as fall within the true spirit and scope of the invention.

The invention is claimed in accordance with the following:

1. A dark current temperature compensation circuit, comprising:

coupling means directly connected between an input terminal means and an output terminal means, said coupling means for removing the DC components of an input signal applied to said input terminal means;

switch means connected in shunt between said coupling means and said output terminal means, said switch means for connecting said coupling means and said output terminal to a source of reference potential during selected intervals of said input signal;

temperature compensation means connected to said switch means for providing said source of reference potential, said temperature compensation means including;

constant current means;

variable voltage means connected to said constant current means, said variable voltage means providing a voltage which changes as a function of temperature;

variable current means connected to said constant current means and said variable voltage means, said variable current means for providing a variable current which changes as a function of said variable voltage; and conversion means connected to said variable current means and said switch means, said conversion means for converting said variable current to provide said reference potential.

2. The circuit according to claim 1 wherein said coupling means defines an alternating current impedance means.

3. The coupling means according to claim 2 wherein said impedance means defines a capacitor.

4. The circuit according to claim 2 wherein said switch means defines a keyed clamp to key said clamp in synchronism with said input signal.

5. The circuit according to claim 1 wherein said variable voltage means defines a resistance, said resistance changing as a direct function of temperature.

6. The circuit according to claim 1 wherein said variable current means defines a forward biased diode.

7. The circuit according to claim 1 wherein said conversion means defines an amplifier.

8. A method of automatically producing a voltage variable with temperature comprising:

generating a constant current;

applying said constant current to a resistance means whose resistance varies as a function of temperature to produce a first variable voltage which changes as a function of temperature;

biasing a diode with said variable voltage to produce a reverse current through said diode which changes as a function of temperature; and converting said current to a second voltage, said second voltage variable with temperature.

* * * * *